United States Patent [19]
Peters

[11] 3,879,217

[45] Apr. 22, 1975

[54] ELECTRIC STORAGE BATTERY GRIDS

[75] Inventor: Kenneth Peters, Worsley, England

[73] Assignee: Electric Power Storage Limited, London, England

[22] Filed: Feb. 13, 1974

[21] Appl. No.: 442,188

[30] Foreign Application Priority Data
Mar. 15, 1973  United Kingdom............... 12572/73

[52] U.S. Cl. ............... 135/26; 75/166 B; 75/166 C; 136/65
[51] Int. Cl. ............................................ C22c 11/00
[58] Field of Search ......... 75/166 B, 166 C; 136/26, 136/65

[56] References Cited
UNITED STATES PATENTS

| | | | |
|---|---|---|---|
| 1,021,997 | 4/1912 | Morrison | 136/65 |
| 2,620,367 | 12/1952 | Brown | 136/65 |
| 2,694,628 | 11/1954 | Carroll | 75/166 C |
| 2,953,619 | 9/1960 | Zahn | 136/65 |
| 3,008,853 | 11/1961 | Borchers et al. | 75/166 B X |
| 3,144,356 | 8/1964 | Dubrovics | 136/65 |
| 3,801,310 | 4/1974 | Nijhawan | 75/166 C |

FOREIGN PATENTS OR APPLICATIONS

| | | |
|---|---|---|
| 1,193,253 | 5/1965 | Germany |
| 622,512 | 5/1949 | United Kingdom |

*Primary Examiner*—L. Dewayne Rutledge
*Assistant Examiner*—E. L. Weise
*Attorney, Agent, or Firm*—Oblon, Fisher, Spivak, McClelland & Maier

[57] ABSTRACT

An electric storage battery grid made from an antimonial lead alloy containing up to 4.0% antimony contains 0.001 to 0.005% selenium and arsenic, copper and tin. The alloy has improved casting properties and a reduced tendency to release antimony in use.

9 Claims, 2 Drawing Figures

ELECTRIC STORAGE BATTERY GRIDS

BACKGROUND OF THE INVENTION

1. Field of the Invention

The present invention relates to lead alloys in particular those suitable for use in making plate grids for lead acid electric accumulators, to such grids and to accumulators incorporating such grids.

2. Description of the Prior Art

Lead antimony alloys are known for such use. Pure lead is too weak and antimony is added to improve the strength and castability of the alloy. However, at concentrations of the order of above 4% there is a significant tendency for the antimony to be released from the grid into the electrolyte during service and on charging to be deposited on the spongy lead of the negative plate. This results in a reduction of the hydrogen over voltage and the local cells of lead and antimony set up on the negative plate also cause loss of charge on open circuit.

It is desirable to reduce the antimony content to as low as possible to reduce open circuit losses and to render the battery resistant to the bad effects of overcharging such as tend to occur with automotive batteries charged from alternating current sources, e.g. alternators.

SUMMARY OF THE INVENTION

According to the present invention the reduction in antimony content of a lead antimony alloy is compensated for by an addition of up to a certain amount of selenium such as to render the alloy castable in the form of thin grids, e.g., 1.0 to 3.0 mms thick in a sufficiently strong and durable form for subsequent handling such as automatic pasting with active material.

DESCRIPTION OF PREFERRED EMBODIMENTS

Thus according to the present invention an electric storage battery grid is made from an alloy which comprises, by weight, antimony up to 4.0%, e.g., 0.1% to 4.0% preferably 1.0% to 3.0%; 0% up to 0.5% arsenic, e.g., 0.05% or 0.2% to 0.5% preferably 0.25% to 0.4%; .0% up to 0.1% copper, e.g. 0.02% to 0.05%; 0% up to 0.5% sulphur e.g. 0.0001% to 0.01% or 0.1% e.g. 0.0002% to 0.001% or 0.01% or 0.05%; 0% up to 0.5% tin, e.g. 0.01% to 0.4% or 0.02% to 0.04%, and selenium up to less than 0.005%, e.g. 0.001% to 0.004%, the balance being lead, trace elements, known optional alloy ingredients and impurities.

The invention may be put into practice in various ways and a number of melt compositions from which grids can be cast will be described by way of example only and are set out in Table 1 below.

TABLE I

| Alloy | Sb% | As% | Cu% | Sn% | Se% | S% |
|---|---|---|---|---|---|---|
| 1 | 2.8 | 0.05 | <0.01 | 0.01 | | <0.001 |
| 2 | 2.6 | 0.05 | <0.01 | 0.01 | 0.004 | <0.001 |
| 3 | 3 | 0.4 | 0.05 | 0.4 | 0.004 | <0.001 |
| 4 | 3 | 0.4 | 0.05 | 0.4 | 0.001 | <0.001 |
| 5 | 1 | 0.4 | 0.05 | 0.4 | 0.004 | <0.001 |
| 6 | 1 | 0.4 | 0.05 | 0.4 | 0.001 | <0.001 |
| 7 | 1 | 0.25 | 0.02 | 0.02 | 0.004 | <0.001 |
| 8 | 1 | 0.25 | 0.02 | 0.02 | 0.001 | <0.001 |
| 9 | 3 | 0.25 | 0.02 | 0.02 | 0.004 | <0.001 |
| 10 | 3 | 0.25 | 0.02 | 0.02 | 0.001 | <0.001 |

Alloys 1 and 2 are actual compositions, alloys 1 to 10 are added to the melt based on total weight.

Figure 1:

Microscopic examination of alloy 1 cast as a test piece in the form of a bar of cross section 1.6 cms by 0.8 cms revealed a skin region of generally parallel elongated grains about 2.5 cms long extending inwardly from the surface with more compact but irregular shaped and somewhat elongated grains ranging from about 0.8 mms to about 1.6 mms in maximum dimension in the plane of the cross section. FIG. 1 shows alloy 1 at 5 times magnification. Microscopic examination of alloy 2 cast as a test piece in the form of a bar of cross section 2.4 cms by 0.8 cms revealed a much thinner skin region of less elongated grains about 1 mm long extending inwardly from the surface with compact grains ranging from about 0.2 mms to about 0.6 mms in maximum longitudinal dimension, these grains are very evenly distributed through the material and the majority are about 0.4 to 0.5 mms in maximum longitudinal dimension in the plane of the cross section and the majority have maximum transverse dimensions which are well in excess of 50% of their maximum longitudinal dimensions, e.g., in the range 60% to 90%. The maximum longitudinal dimension is the longest straight line connecting the grain boundaries on either side of the grain. The maximum transverse dimension is the longest straight line joining boundaries of the grain on either side of the maximum longitudinal dimension and which is perpendicular thereto.

Figure 2:
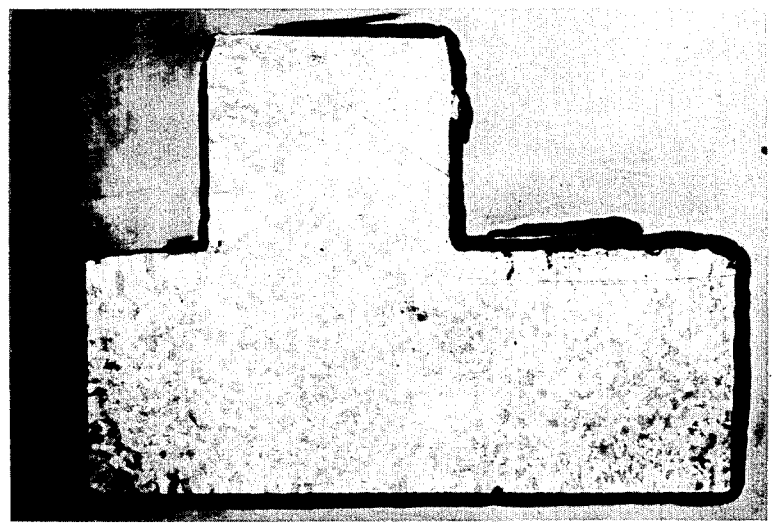

FIG. 2 shows alloy 2 at five times magnification.

The alloy may be made from virgin lead which typically comprises 99.9% lead, traces of copper and traces of sulphur (less than 0.0001) by the addition of antimony, arsenic, tin and selenium in which case very little copper and sulphur is present in the cast grid.

Alternatively the alloys may be made from reclaimed lead acid battery scrap. This is made from scrap lead alloy from plate casting and defunct battery plates the scrap which contains some lead sulphate and lead oxide is placed in a blast furnace and reduced to produce a molten metal typically containing 3.5% (± 0.5%) antimony, 0.05% (± 0.03%) arsenic, 0.075 (± 0.025%) copper and tin balance lead. This is placed in a steel pan and heated to 580°C and an approximately two fold excess by weight based on copper, i.e., 0.15% (± 0.05%) of elemental sulphur added. The mixture is stirred for 30 minutes at 550°C and the copper sulphide which rises to the surface skimmed off and discarded.

This lowers the copper content of the remaining metal to not more than 0.05%, e.g., preferably 0.02%. Traces of copper sulphide may remain distributed through the melt. The sulphur content of a sample cast from this material is typically less than 0.001%, e.g., 0.0002 to 0.0005%.

The metal is then mixed with the alloy ingredients to bring it up to the desired composition. The metal is then cast at about 330°C in a cast iron mould the surfaces of which are dusted with cork powder to assist in proper filling of the mould cavity without premature freezing.

What I claim as my invention and desire to secure by Letters Patent is:

1. An electric storage battery grid made from an alloy comprising by weight:
   Up to 4.0% antimony,
   0% up to 0.5% arsenic,
   0% up to 0.1% copper,
   0% up to 0.5% sulphur,
   0% up to 0.5% tin, and selenium 0.001% up to less than 0.005%, the balance being lead, trace elements, known optional alloy ingredients and impurities.

2. An electric storage battery grid as claimed in claim 1 in which the alloy contains 1% to 3% antimony.

3. An electric storage battery grid as claimed in claim 1 in which the alloy contains 0.05% to 0.4% arsenic.

4. An electric storage battery grid as claimed in claim 1 in which the alloy contains 0.02% to 0.05% copper.

5. An electric storage battery grid as claimed in claim 1 in which the alloy contains 0.01% to 0.4% tin.

6. An electric storage battery grid as claimed in claim 1 in which the alloy contains 0.001% to 0.004% selenium.

7. An electric storage battery grid as claimed in claim 1 in which the alloy contains
1.0% to 3.0% antimony,
0.05% to 0.4% arsenic,
0.01% to 0.4% tin,
copper in an amount not exceeding 0.05%, and
0.001 to 0.004% selenium.

8. An electric storage battery grid as claimed in claim 1 in which the alloy contains
2.6% antimony,
0.05% arsenic,
0.01% tin,
0.004% selenium, and
less than 0.01% copper, and
less than 0.001% sulphur.

9. A lead acid electric storage battery in which the grids of the electrodes are as claimed in claim 1.

* * * * *